United States Patent Office 3,506,642
Patented Apr. 14, 1970

3,506,642
STABLE ORALLY ACTIVE HEPARINOID COMPLEXES
Teow Y. Koh and Kekhusroo R. Bharucha, Toronto, Ontario, Canada, assignors to Canada Packers Limited, Toronto, Ontario, Canada
No Drawing. Filed July 3, 1967, Ser. No. 650,621
Int. Cl. C08b 19/03, 19/08
U.S. Cl. 260—209    19 Claims

ABSTRACT OF THE DISCLOSURE

This invention relates to new stable, orally active heparinoid complexes, prepared by reacting heparinic acid or other acid heparinoids with non-toxic organic compounds having weakly basic or amphoteric properties and characterized by a base strength $pK_b$ in the range of from about 7.0 to 12.5 or by an isoelectric point pI below about 9.7, to methods for preparing and using these new heparinoid complexes, and to therapeutic compositions containing them. Particularly suitable heparinoid complexes are those prepared from heparinic acid and amino acids having an isoelectric point pI below about 9.7. The new complexes have utility as oral blood anticoagulant and/or lipemic agents.

BACKGROUND

Natural heparin, heparin derivatives and synthetically sulfated polysaccharides, all of which will be referred to hereinafter as heparinoids, have heretofore been prepared and used primarily in the neutral sodium salt form. This is the form of heparin which is presently employed in anticoagulant therapy. However, therapeutic use of these materials is limited by the need to administer them parenterally, since they are inactive or only slightly active per se by the oral route. In view of the long established reputation of heparinoids as safe and effective blood anticoagulants and/or antilipemic agents, a great deal of research has been devoted toward the development of adjuvants, derivatives and other expedients in an effort to render the known heparinoids absorbable through the intestinal walls so that they can be orally administered. However, this research has had limited success to date.

In the copending United States application Ser. No. 561,346 of Teow Yan Koh, filed June 29, 1966, it was disclosed that heparinic acid per se readily passes through the intestinal walls to provide an extremely high anticoagulant activity. The free acid form of heparin would, therefore, be an excellent anticoagulant, but unfortunately its stability is poor. Heparinic acid begins to decompose almost immediately and is difficult to isolate or handle. It was found by Koh that by partially satisfying the free acid groups of heparinic acid by reaction with a base, e.g. sodium or potassium hydroxide or strong organic bases, such as choline, to provide an acid salt, the stability was improved and some of the heparinic activity on oral administration could be retained. The acid salts of heparinic acid, such as the sodium, potassium and choline acid salts, are absorbable from the mammalian intestine to a useful extent, though less readily than heparinic acid, with the amount of absorption being inversely proportional to the cationic content of the salt. However, the stability of these acid salts also decreases with decreasing cationic content so that the formulation is necessarily a compromise between stability and heparinic activity.

SUMMARY OF THE INVENTION

We have now discovered that heparinic acid forms salts or complexes (hereinafter collectively designated as heparinoid complexes) with a number of weakly basic or amphoteric organic compounds to provide products which are not only quite stable but which when orally administered result in systemic anticoagulant effect of high order.

The expression "oral administration," as used herein, means administration by mouth and includes introduction of therapeutic compositions containing the new heparinoid complexes into the sublingual or buccal regions for absorption therefrom as well as the administration in the form of enteric-coated compositions for release of the heparinoid substance in the intestine for absorption through the intestinal walls.

We have further discovered that there is a correlation between the basicity of the basic or amphoteric reactant and the stability-oral activity of the resulting heparinoid complex. Reactants which are too strongly basic, such as the alkali metal bases and the aliphatic amines provide heparinoid complexes which are stable but not orally active. Reactants which are too weakly basic, such as urea, pyrimidine and acetamide provide heparinoid complexes which are very active but unstable under normal storage conditions, and quickly lose their heparinic activity.

We prefer to express the requisite basicity in terms of $pK_b$ values for bases and in terms of pI values for the amphoteric compounds. Therefore, according to the present invention, heparinic acid and related heparinoids having free acid groups are stabilized without substantial loss of their oral effectiveness by forming complexes of the acids with certain non-toxic organic compounds characterized by a base strength $pK_b$ in the range of from about 7.0 to 12.5 or by an isoelectric point pI below about 9.7.

DETAILED DESCRIPTION

It will be understood that heparin is a very complex molecule, with a structure which has not been completely elucidated. It is tentatively identified as a sulfated copolymer consisting of alternating 1–4α linked glucosamine and glucuronic acid residues. In accordance with the invention, the acid form of heparin or related heparinoid is combined with one of a series of weak bases or amphoteric substances, which in themselves are not simple. Therefore, the specific structure of the resulting product cannot be stated with certainty and for this reason the word "complex" is used to embrace salts as well as more complex structures which may be formed.

For purposes of simplification, a schematic representation of the repeating tetrasaccharide heparin unit (sodium salt) is shown below:

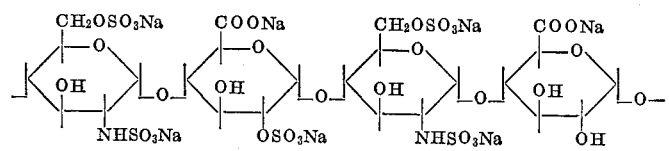

Treatment of sodium heparinate with an acidic ion exchange resin removes the sodium and gives heparinic acid. The conversion to heparinic acid confers oral activity on the molecule but at the same time makes it unstable. We believe that this instability probably arises by autocatalytic destruction of the acid labile O- and/or N-sulfate and glycosidic linkages. However, whatever the cause of such instability, we have found that stabilization can be achieved without destruction of the oral activity by reaction of the acid heparin with selected weakly basic or amphoteric substances. It is found that heparinic acid, being a strong acid, forms stable complexes even with the relatively weakly basic substances. Salt or complex formation is believed to be involved with at least the sulfonic acid group of heparinic acid. In pertinent cases, as with amino-amides (e.g. nicotinamide), stability may be further increased by hydrogen bond formation through the amide linkages.

In aqueous solution all such compounds may dissociate, releasing heparinic acid. On the other hand, salts of heparinic acid with strong bases, and in particular the neutral salts of the strong bases, apparently do not release heparinic acid in aqueous solution in a form in which it can be absorbed through the mucous membranes of the mammalian body. We believe that the absorption of heparinic acid from the mouth or intestine, in the present instance, takes place by the process of passive diffusion of that fraction of heparinic acid, which, after release from the heparinoid complex, remains in the unionized form.

It is to be understood, however, that this invention is not to be limited to any particular theory of operation.

The complexing agents suitable for the purposes of the present invention, and which yield complexes with heparinic acid and other acid heparinoids, resulting in good stability coupled with high oral activity, are those organic bases which have a base strength $pK_b$ in the range of from about 7.0 to 12.5, preferably about 9.0 to 12.5, and those organic amphoteric compounds which have an isoelectric point pI below about 9.7. Amphoteric substances over the range of from about 2.7 to 9.7 have been successfully tested and the criticality of the lower limit has not been determined. Specific examples include most of the amino acids which occur in nature or which have been isolated from proteins, e.g. alanine, asparagine, aspartic acid, cysteine, cystine, glutamic acid, glutamine, glycine, histidine, hydroxyproline, isoleucine, leucine, methionine, phenylalanine, proline, serine, threonine, tryptophane, glycylglycine, glycylvaline, aspartyltyrosine, tyrosine and valine, derivatives and metabolic products of natural amino acids, including diiodotyrosine, γ-aminobutyric acid, nicotinic acid, nicotinamide, γ-aminolaevulinic acid, imidazolelactic acid, creatine, phosphocreatine, γ-butyrobetaine and glycinebetaine; and synthetic amino acids, such as anthranilic acid, p-aminobenzoic acid, γ-aminoacetoacetic acid, 4-aminobutyl phosphoric acid and aminoethylphosphoric acid. The aforementioned amino acids may be in the D-, L- or DL- form. The amino acids isolated from proteins are defined herein as those listed in "Organic Chemistry" by Fieser and Fieser (2nd ed. 1950), pages 431 and 432. Those which fall within the $pK_b$ or pI ranges above are suitable for purposes of the invention. Other compounds within the $pK_b$ range given above, and which may be classified as organic bases are:

| Compound: | $pK_b$ |
|---|---|
| imidazole | 7.05 |
| Pyridine | 8.75 |
| 3-amino-cinnoline | 10.3 |
| 2-aminothiazole | 8.6 |
| 1,3-diamino-1,3-bishydoxyiminopropane | 9.3 |
| 1-diprop-2-ynylamino-prop-2-yne | 10.9 |
| 2-trimethylsilylmethylaminopropane | 10.8 |
| Purine | 11.7 |
| 4-ureidosulphonylaniline | 12.2 |
| 2-ethoxycarbonylaniline | 11.8 |
| 3-amino-biphenyl | 9.7 |
| 2-amino-4,6-dimethylpteridine | 11.3 |
| 2-amino-6,7-dimethylpteridine | 10.6 |
| 2-aminoquinoxaline | 10.1 |
| 2,3-diaminoquinoxaline | 9.3 |
| 2-aminoquinazoline | 9.3 |
| 1,4-dihydro-1-methyl-4-oxo-quinazoline | 10.9 |
| 1,2,4-triazole | 11.7 |
| 2-aminopyrimidine | 10.6 |
| 5-amino-4-methylpyrimidine | 10.9 |
| 1-phenylpyrrolidine | 9.7 |
| Methylindanylamino-indan | 9.4 |
| O-aminohydroxymethane | 9.4 |
| Semicarbazide | 10.4 |
| N-methyl-1,4-benzoquinone-imine | 10.1 |
| 1,4-benzoquinoneimine | 10.1 |
| N-benzyl-1,4-benzoquinoneimine | 11.2 |
| Thioflavine T | 11.3 |
| N-methylcytidin | 10.1 |
| Biliverdine | 9.0 |
| 2,4,2',4',2''-pentamethoxytriphenylcarbinol | 12.2 |
| Rhodamine B | 10.8 |

It will be understood that the invention is not limited to these specific examples and that those skilled in the art will be able to select many related complexing agents having a base strength or isoelectric point within the ranges given.

Compounds such as urea, pyrimidine and acetamide are weak bases with a $pK_b$ value above the limit of 12.5. These weak bases readily form complexes with heparinic acid which provide significant increases in blood clotting time by absorption through the mucous membranes. However, the stability of these complexes is quite low, decomposition and loss of heparinic activity at room temperature beginning within 20 days. Dimethylamine and choline, on the other hand, are stronger bases with a $pK_b$ value below the limit of 7.0. While these compounds form stable complexes with heparinic acid, the resulting complexes do not provide a significant rise in the level of blood clotting time. Likewise, lysine which is an amino acid outside the range of isoelectric points of the preferred complexing agents will not provide a complex showing a significant rise in the level of blood clotting time.

While we have referred to heparinic acid in the above description, it will be understood that the same principles apply to heparinic acid derivatives and related heparinic compounds (heparinoids) which have acid groups and which as salts with strong bases are orally inactive. Thus, OH and/or carboxyl substituted heparinic acid derivatives when stabilized by the present invention also provide orally active heparin preparations. Acid salts of heparin which, although possessing useful oral heparinic activity, are of undesirably low stability and can be made more stable by the process of the present invention. Here a portion of the free acid groups are satisfied by a cation of a strong base with the other acid groups being satisfied by salt formation or complexing with the complexing agents of this invention. Related heparinoids such as sodium dextran sulfate which are normally ineffective orally can be treated to provide free acid groups and, like heparinic acid, can be stabilized by reaction with the selected organic complexing agents. While anticoagulant activity has been referred to above, heparinoid compounds which possess selective or additional antilipemic activity can also be made orally active by the present invention.

The preparation of the heparinoid complexes in accordance with the invention is quite simple. Thus, the sodium or other cation is removed from sodium heparinate or other available heparinoid salt, with an ion exchange resin and the effluent is collected and is reacted with the complex forming agent. Enough of the latter is used to neutralize or react with all of the sulfate groups and a slight excess, for example 10%, may be used to insure complete reaction. The product is then isolated in the form of a white powder by lyophilization or precipitated from aqueous solution with a water-miscible organic solvent. It can be converted to pill, lozenge or tablet form. Organic solvent precipitation, e.g. by addition of an alcohol or ketone solvent, has the advantage of producing an amorphous solid with free-flowing characteristics which is more easily converted to tablet form than the fluffy powder obtained by lyophilization. If desired, the heparinic acid, after passing through the ion exchange resin in hydrogen form, can be collected into another vessel containing resin in hydroxyl form to selectively mop up any traces of inorganic acid which may have formed by the hydrolysis of the heparinic acid. This, however, is merely a precautionary measure and does not constitute an essential part of the invention.

Suitable ion exchange resins are commercially available. Different types of ion exchange resins and different techniques may be employed. For example, strongly acidic cationic exchange resins, such as the nuclear sulfonated ion exchange resins described in U.S. Patent No. 2,366,007, one of which is sold by the Dow Chemical Company under the trade name of Dowex 50W, may be used in the hydrogen form in excess of the theoretical amount for direct production of heparinic acid from sodium heparinate solution. Sodium or other acid heparinates may be prepared by the process of the aforesaid Koh application Ser. No. 561,347.

The new heparinoid complexes are in solid form so that they can be readily formulated into powders, pills, lozenges, tablets or capsules. Where the absorption is to take place in the intestine, the compositions are given an enteric coating to avoid release of the heparinoids in the stomach and destruction by the stomach acids. The new heparinoid complexes in the aqueous medium of the mouth or intestine, provide the active component in a form which can be absorbed through the mucous membranes of these regions.

Dosage units for intestinal absorption are provided with an enteric coating of any conventional formulation (e.g. the procedure of Remington's Practice of Pharmacy or of U.S. Patent No. 3,126,320). Preparation of buccal or sublingual tablets is also conventional procedure. The heparinoid complexes may be administered in relatively pure form, but it is to be understood that they may be combined with inert diluents such as starch, sugar, various stearates and carbonates, kaolin, etc.

The particular dosage, or range for the dosage, which will be employed in treating a patient with a heparinoid complex in accordance with the present invention will vary in accordance with a number of factors but can be readily determined by those skilled in the art with respect to a selected complex and patient's need. Thus, the absorbable anticoagulant activity per mg. will vary with the selected complexing agent, but the heparinic activity of each is easily determinable by simple assay. Tablets or powders administered buccally or sublingually in sufficient dosage to provide approximately 100 to 10,000 anticoagulant units per kilogram of body weight are contemplated. In the dog, sublingual administration at a level of 3,000 units/kg. provided a significant prolongation of blood clotting time. Dosage in the same general range, provided with an enteric coating and swallowed will, by absorption in the intestinal tract, likewise significantly increase blood clotting time.

What is required of an effective therapeutic dosage is that it at least doubles the normal blood coagulation time of the patient, and with this basic requirement known, a suitable dosage can readily be determined for each individual heparinoid complex. Because oral administration does not have the disadvantages attendant upon parenteral administration, administration can be more frequent to effect a more closely controlled and sustained level of anticoagulant activity in the blood. In general, it is contemplated that the tablets or capsules will contain sufficient of the heparinoid complex to provide a heparin activity of from about 500 to 50,000 U.S.P. anticoagulant units, and that these would be administered in sufficient quantity to provide a dosage of 100 to 10,000 anticoagulant units per kilogram of body weight with repeat dosages several times daily as may be required.

The following is an illustrative general method for preparing heparinoid complexes from a commercial sodium heparinate. The assays for anticoagulant activity in all instances referred to below were carried out by the method described in U.S. Pharmacopeia XVII.

Examples 1–20.—Preparation of heparinic acid complexes

Sodium heparinate (6.25 g.) containing ca 12% sodium was percolated through a 2 x 30 cm. column containing 40 ml. of Dowex 50W–X8 resin ($H^+$ form). The effluent was collected in a beaker containing 10 ml. of Dowex 1–X1 resin ($OH^-$ form), and the suspension was stirred for 10 minutes at room temperature. The resin was filtered off and the aqueous phase was added to a weighed amount of a selected complexing agent. On lyophilization, white powders were obtained, which were assayed for anticoagulant activity at spaced intervals of time.

By the procedure given above, heparinoid complexes were prepared as set forth in the following table.

TABLE I

| | | | In vitro, anticoagulant activity, units/mg. | |
|---|---|---|---|---|
| Example No.: | Complexing agent | Ratio by weight of heparinic acid to complexing agent | Starting sodium heparinate | Complex based on heparin content |
| 1 | Urea | 1.00 | 114 | 102 |
| 2 | Pyrimidine | 2.06 | 164 | 182 |
| 3 | Acetamide | 4.17 | 165 | 160 |
| 4 | Purine | 1.67 | 164 | 180 |
| 5 | Nicotinamide | 1.75 | 147 | 140 |
| 6 | do | 1.58 | 165 | 162 |
| 7 | Pyridine | 2.57 | 164 | 165 |
| 8 | Imidazole | 3.18 | 164 | 162 |
| 9 | Choline | | 140 | 130 |
| 10 | DL-Aspartic acid | 1.63 | 164 | 165 |
| 11 | L-glutamic acid | 1.57 | 164 | 179 |
| 12 | Anthranilic acid | 1.54 | 150 | 166 |
| 13 | p-Aminobenzoic acid | 1.49 | 150 | 162 |
| 14 | DL-Asparagine | 1.65 | 164 | 160 |
| 15 | L-glutamine | 1.49 | 164 | 181 |
| 16 | L-valine | 1.81 | 164 | 177 |
| 17 | Glycine | 3.07 | 164 | 179 |
| 18 | β-Alanine | 2.66 | 164 | 179 |
| 19 | L-histidine | 1.61 | 164 | 141 |
| 20 | L-lysine | 1.31 | 164 | 177 |

Examples 21–23.—Preparation of sodium acid heparinate complexes

An aqueous solution of neutral sodium heparinate (164 U.S.P. anticoagulant u./mg.) was mixed with an excess of strongly acidic cation exchange resin (Dowex 50W–X8) in the acid form and contact was maintained for about 15 minutes. After separation of the aqueous heparinic acid phase from the resin beads by filtration, it was divided into portions to which different quantities of NaOH solution were added to partially neutralize the heparinic acid. To the resulting sodium acid heparinate solutions were added one of the complexing agents of the present invention. The following sodium acid heparinate complexes were prepared in this manner:

and the jejunum identified. Each heparinoid complex, adjusted to contain 39,000 u., was dissolved in 2 ml. $H_2O$, and injected directly into the jejunum or instilled into an isolated, ligated loop of approximately 6 inches in length.

Blood samples were taken by cardiac puncture at time intervals after administration and the clotting time determined by the capillary method of Mayer (Mayer, G. A., J. Lab. Clin. Med. 49,938 (1957)).

Table III shows the translocation of heparin into the blood when the complexes of Examples 1–20 were administered to the rabbit jejunum. The appearance of heparin in the blood was indicated by the prolongation of the whole-blood clotting time from a normal clotting time of 8′45″.

TABLE II

| Complexing agent | Ratio by weight of sodium acid heparinate to complexing agent | Sodium content based on heparin, percent | In vitro, anticoagulant activity units/mg. | |
|---|---|---|---|---|
| | | | Starting sodium heparinate | Complex based on heparin content |
| Example No.: | | | | |
| 21 ........ Nicotinamide ........ | 2.13 | 2.4 | 164 | 180 |
| 22 ........ Urea ................ | 1.03 | 2.4 | 164 | 160 |
| 23 ........ Anthranilic acid ..... | 3.13 | 0.16 | 164 | 160 |

Example 24.—Glycine complex of dextran sulfuric acid

An amount of 3.0 g. sodium dextran sulfate (M.W. 16,200, heparin-like activity, 17 U.S.P. anticoagulant u./mg.) was dissolved in 10 ml. $H_2O$. The solution was percolated through a 2 x 30 cm. column containing 30 ml. of Dowex 50W–X8 resin, $H^+$ form. The effluent was immediately added to an aqueous solution containing 1.5 g. glycine, and then lyophilized. Upon lyophilization, a powder (glycine complex of dextran sulfuric acid) was obtained, yield 4.13 g., anticoagulant assay 14 U.S.P. u./mg.

Example 25.—Acetone precipitation of glycine complex of heparinic acid

An aqueous solution of 2.0 g. sodium heparinate (150 U.S.P. anticoagulant u./mg.) was percolated through a 2 x 30 cm. column containing 20 ml. Dowex 50W–X8 resin, $H^+$ form. The effluent was immediately added to an aqueous solution containing 0.6 g. glycine. The total volume measured 145 ml. The solution was concentrated in vacuo at a bath temperature of up to 48° C. to 15–20% of its original volume. Four times its volume of acetone was added which caused an immediate cloudy precipitate to form. The precipitate was collected by centrifugation, yield 1.87 g.; assaying at 118 U.S.P. anticoagulant u./mg., based on total solids.

Example 26.—Methanol precipitation of glycine complex of heparinic acid

An aqueous solution of 5.0 g. sodium heparinate (150 U.S.P. anticoagulant u./mg.) was converted to heparinic acid by percolating through a Dowex 50W–X8, $H^+$ form, resin bed. The effluent was added to 1.83 g. glycine. The volume was reduced by concentrating in vacuo at 48° C. to 10% its original. Four times its volume of methanol was added, causing a cloudy precipitate to form. The precipitate was collected by filtration, yield 3.97 g., assaying at 114 U.S.P. anticogulant u./mg., based on total solids.

INTESTINAL ABSORPTION OF HEPARINIC ACID COMPLEXES (RABBIT)

Ether-anesthetized rabbits, after overnight fasting, weighing 2–3 kg. were used. The abdomen was entered

TABLE III

| Complexing agent | $pK_b$ | pI | Stability, days | Blood clotting time 1 hour after administration |
|---|---|---|---|---|
| (1) Urea .................... | 13.82 | | 1–12 | >1,200′ |
| (2) Pyrimidine .............. | 12.77 | | 1–17 | >1,200′ |
| (3) Acetamide ............... | 12.60 | | 1–8 | |
| (4) Purine .................. | 11.70 | | >130 | >360′ |
| (5) Nicotinamide ............ | 10.65 | | >183 | >300′ |
| (6) Nicotinamide ............ | 10.65 | | >162 | >1,440′ |
| (7) Pyridine ................ | 8.75 | | >20 | 23′50″ |
| (8) Imidazole ............... | 7.05 | | >99 | 12′20″ |
| (9) Choline ................. | 5.06 | | (1) | 9′40″ |
| (10) DL-aspartic acid ........ | | 2.77 | >145 | >360′ |
| (11) L-glutamic acid ......... | | 3.22 | >132 | [2] 480′ |
| (12) Anthranilic acid ........ | | 3.52 | >66 | [2] 120′ |
| (13) p-Aminobenozic acid ..... | | 3.65 | >66 | [2] 600′ |
| (14) DL-asparagine ........... | | 5.41 | >139 | >1,200′ |
| (15) L-glutamine ............. | | 5.65 | >125 | >360′ |
| (16) L-valine ................ | | 5.96 | >65 | [2] 240′ |
| (17) Glycine ................. | | 5.97 | >84 | >1,140′ |
| (18) β-Alanine ............... | | 7.32 | >81 | >1,640′ |
| (19) L-histidine ............. | | 7.59 | >107 | 17′33″ |
| (20) L-lysine ................ | | 9.74 | >105 | 9′25″ |

[1] Indefinitely.
[2] Approximately.

From the foregoing Table III it will be seen that the organic bases purine (4) and nicotinamide (5), which had a $pK_b$ within the range of 9.0 to 12.5 exhibit a stability greater than 130 days coupled with a blood clotting time 1 hour after administration far in excess of the therapeutic level. The stability limits for those complexes was not reached in the duration of the test period. Urea and pyrimidine which are weak bases having a $pK_b$ above 12.5 give complexes which, while exhibiting a high oral anti-clotting activity, were substantially decomposed within 17 days. Acetamide, also outside of the $pK_b$ range, likewise gives a complex having an undesirably low stability. At the other end of the scale, the complex with chlorine, which is a strong base, had relatively little oral anti-clotting activity although satisfactory stability. Pyridine, near the lower end of the preferred range of $pK_b$ value, formed a complex which barely gave rise to therapeutic level of anti-clotting activity. In the amino acid group, all of the complexes demonstrated satisfactory heparinic stability in excess of 25 days, but L-lysine, having a pI value outside of the preferred range, exhibited very little oral anti-clotting activity in comparison with the preferred complexes.

Additionally, while not shown in Table III, the anti-clotting activity with heparinic complexes of L-glutamic acid, anthranilic acid and glycine were quite prolonged, the complex of heparinic acid with L-glutamic acid showing a blood clotting time of greater than 540 minutes 4 hours after administration, that of anthranilic acid showing a blood clotting time of greater than 420 minutes 2 hours after administration and that of glycine showing a blood clotting time of greater than 420 minutes 6 hours after administration. The glycine complex made by the method of Example 25 when injected intrajejunally to a rabbit was absorbed to provide a blood clotting time greater than 600' one hour after injection and by the sixth hour the clotting time was still above the therapeutic level.

INTESTINAL ABSORPTION OF SODIUM ACID HEPARIN COMPLEXES (RABBIT)

The activity of sodium acid heparin complexes upon administration of 39,000 units to the rabbit jejunum is demonstrated in the following Table IV.

TABLE IV

| Complexing agent | Ratio by weight of sodium acid heparinate to complexing agent | Sodium content based on heparin, percent | Stability, days | Clotting time, 1 hour after administration |
|---|---|---|---|---|
| Nicotinamide | 2.13 | 2.4 | >126 | 71'6" |
| Urea | 1.03 | 2.4 | >20 | 30'23" |
| Anthranilic acid | 1.54 | 0.16 | >66 | [1] 120' |

[1] Approximate.

It will be seen from the foregoing table that the combination of sodium as part of the cation of the heparinic acid salt in combination with the complexing with the remaining free acid component with a weak base such as urea results in a more stable composition than the complex of heparinic acid and urea alone. However, the increased stability is at the expense of anticoagulant activity. All of the complexes of the acid salts shown here had satisfactory stability coupled with a therapeutic level of anti-clotting activity. Sodium acid heparinate (2.4% Na) complexes with nicotinamide and urea were absorbed to produce an increase of 8 and 3 fold the normal clotting time respectively an hour after administration.

INTESTINAL ABSORPTION OF COMPLEXES OF DEXTRAN SULFURIC ACID (RABBIT)

A quantity of the glycine complex of dextran sulfuric acid, prepared by the method of Example 24, equivalent to 20,000 anticoagulant units was dissolved in 4.0 ml. of H$_2$O. It was then instilled into a rabbit ligated intestinal loop in situ as described above, and the systemic anticoagulant activity measured as before. The blood clotting time was elevated to 13'00", from a normal of 8'45", an hour after administration. By the second hour it had exceeded 300'. The sodium salt of dextran sulfuric acid per se is not absorbed from the intestine.

INTESTINAL ABSORPTION OF HEPARINIC ACID COMPLEXES (DOG)

The following Table V shows the systemic anticoagulation in the dog after intrajejunal injection of 2,850 units per kg. body weight of the glycine complex of heparinic acid.

TABLE V

| Dog No. | Weight, kg. | Blood clotting time, hrs. after injection | | | | | |
|---|---|---|---|---|---|---|---|
| | | 0 | 1 | 2 | 3 | 4 | 5 | 5½ |
| 1 | 13.7 | 8'19" | 38'35" | 17'12" | 15'00" | | 13'31" | |
| 2 | 10.5 | 8'45" | [1] 450' | [1] 390' | | 28'40" | | 9'35" |
| 3 | 10.8 | 9'35" | [1] 480' | >660' | [1] 360' | [1] 240' | | |

[1] Approximate.
Blood samples were withdrawn by venous punctures.

In all of the animals the blood clotting time was prolonged significantly an hour after injection. The prolongation of therapeutic levels of anticoagulant activity by administration of dosage levels to the dog as shown exceeds four hours. The animals were anesthetized during the test and would be expected to show more uniform response without anesthesia.

INTESTINAL ABSORPTION OF HEPARINIC ACID COMPLEXES (PIG)

The following Table VI demonstrates the anticoagulant activity of the glycine complex of heparinic acid in an 84 Kg. pig after intrajejunal injection to the anesthetized animal:

Table VI

Dose, units per kg. body weight _____ 600
Blood clotting time hours after injection:
```
    0 _____ 8'47"
    1 _____ (approx.)   175'
    2 _____ 54'07"
    3 _____ 40'62"
    4 _____ _____
    5 _____ 18'20"
    6 _____ 10'28"
```

This experiment was performed with a sample of glycine complex of heparinic acid which contained less than 0.05% sodium, and the blood samples were withdrawn by cardiac punctures. At a dose of 600 units per kg. body weight, absorption was sufficient to provide a prolonged blood clotting time of approximately 175', an hour after injection. The blood clotting time then gradually declined but significantly raised clotting time could still be detected at the sixth hour after injection. A therapeutically effective level of heparin in the blood was maintained for approximately 5½ hours. Similar experiments on the pig also resulted in a significant increase in blood clotting time.

ADMINISTRATION OF HEPARINIC ACID COMPLEXES BY MOUTH

(1) Intestinal absorption

Enteric-coated tablets containing glycine complex of heparinic acid were manufactured. Each tablet contained approximately 140 mg. of glycine complex of heparinic acid (120 U.S.P. anticoagulant u./mg.), 120 mg. Avicel (a binder) and 90 mg. Stereo-tex (a lubricant) and was coated with cellulose acetate phthalate.

Two tablets were fed to a female mongrel dog weighing 11.6 kg. Blood samples were withdrawn prior to feeding the tablets and at time intervals after feeding. The clotting time was determined by the capillary method of Mayer.

Following a lag period of 4½ hours, the blood clotting time was raised from a normal value of 5'12" to 8'40". A peak activity of 16'30" was attained after 5½ hours, after which the blood clotting time gradually declined. Prolonged blood clotting time was detected for at least 3 hours.

(2) Sublingual absorption

An amount of 280 mg. glycine complex of heparinic acid (120 U.S.P. anticoagulant u./mg.) in the powder form was placed under the tongue of a pentobarbital-narcotised female dog, weighing 11.6 kg. Blood samples were withdrawn by venous puncture at time intervals after administration and the clotting time determined by the capillary method of Mayer.

The blood clotting time was raised from a normal value of 10′30″ to 18′45″ at the second hour after administration. By the fourth hour, the blood time had returned to the normal value.

It is well known that sodium heparinate per se is not absorbed from the buccal cavity.

The disclosure herein should not be taken as a recommendation to use the disclosed invention in any way without full compliance with the United States Food and Drug Laws and other laws and governmental regulations which may be applicable.

We claim:

1. A water soluble heparinoid complex having anticoagulant and/or anti-lipemic activity on oral administration, selected from the group consisting of
   (a) a complex of a heparinoid having free acid groups with a non-toxic amino-acid having a pI value below about 9.7, and
   (b) a complex of a heparinoid having free acid groups with a non-toxic organic base having a $pK_b$ value in the range of from 9.0 to 12.5.

2. A heparinoid complex as defined in claim 1 wherein the heparinoid having free acid groups and forming the complex with the amino acid or base is heparinic acid.

3. A heparinoid complex as defined in claim 1 wherein the heparinoid having free acid groups and forming the complex with the amino acid or base is dextran sulfuric acid.

4. A heparinoid complex as defined in claim 1 wherein the heparinoid having free acid groups, and forming the complex with the amino acid or base, is an acid heparinate having a portion of the acid groups of the heparinic acid molecule satisfied by a strongly basic cation.

5. A complex of heparinic acid having a portion of the acid groups of the heparinic acid molecule satisfied by a strongly basic cation and the remainder of the said acid groups complexed with a non-toxic organic base having a $pK_b$ value above 7.0.

6. A complex of heparinic acid and an amino acid selected from the group consisting of aspartic acid, glutamic acid, anthranilic acid, p-aminobenzoic acid, asparagine, glycine, glutamine, valine and β-alanine.

7. A complex of heparinic acid and nicotinamide.
8. A complex of heparinic acid and purine.
9. A complex of heparinic acid and DL-aspartic acid.
10. A complex of heparinic acid and L-glutamic acid.
11. A complex of heparinic acid and DL-asparagine.
12. A complex of heparinic acid and glycine.
13. A complex of heparinic acid and anthranilic acid.
14. A complex of heparinic acid and p-aminobenzoic acid.
15. A complex of dextran sulfuric acid and glycine.

16. A method for providing an orally active heparinoid in water soluble stable form comprising: treating a heparinoid salt to provide free acid groups on the heparinoid molecule and reacting the resulting acid heparinoid with a complexing agent selected from the group consisting of (a) a non-toxic amino acid having a pI value below about 9.7, and (b) a non-toxic organic base having a $pK_b$ value in the range of from 9.0 to 12.5.

17. The method of claim 16 wherein an aqueous solution of sodium heparinate is subjected to ion exchange with a cation exchange resin in hydrogen form to provide a solution containing heparinic acid and said heparinic acid solution is then reacted with the complexing agent.

18. The method of claim 17 wherein the heparinoid complex is recovered in solid form by lyophilization of the aqueous solution resulting from reaction of the complexing agent with the heparinic acid solution.

19. The method of claim 17 wherein the heparinoid complex is recovered in solid free flowing form by precipitation with an organic solvent from the aqueous solution resulting from reaction of the complexing agent with the heparinic acid solution.

References Cited

UNITED STATES PATENTS

| | | | |
|---|---|---|---|
| 2,786,050 | 3/1957 | Capraro et al. | 260—211 |
| 2,884,358 | 4/1959 | Bush et al. | 260—211 |
| 2,989,438 | 6/1961 | Nomine et al. | 260—211 |
| 3,174,903 | 3/1965 | Fischer et al. | 260—211 |
| 3,232,838 | 2/1966 | Nomine et al. | 260—211 |

LEWIS GOTTS, Primary Examiner

J. R. BROWN, Assistant Examiner

U.S. Cl. X.R.

260—211; 424—180, 183

UNITED STATES PATENT OFFICE
CERTIFICATE OF CORRECTION

Patent No. 3,506,642            Dated April 14, 1970

Inventor(s) Teow Y. Koh and Kekhusroo R. Bharucha

It is certified that error appears in the above-identified patent and that said Letters Patent are hereby corrected as shown below:

Column 1, line 25 "lipemic" should read "anti-lipemic".

Column 8, line 66 "chlorine" should read "choline".

SIGNED AND SEALED
SEP 8 - 1970

(SEAL)
Attest:

Edward M. Fletcher, Jr.
Attesting Officer

WILLIAM E. SCHUYLER, JR.
Commissioner of Patents